(12) United States Patent  
Phan et al.

(10) Patent No.: US 9,251,565 B2  
(45) Date of Patent: Feb. 2, 2016

(54) HYPER-RESOLUTION IMAGING

(75) Inventors: Long N. Phan, Somerville, MA (US); Jonathan Lee Jesneck, Enfield, CT (US); Sanjay Sarma, Lexington, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 779 days.

(21) Appl. No.: 13/588,072

(22) Filed: Aug. 17, 2012

(65) Prior Publication Data

US 2013/0011078 A1 Jan. 10, 2013

Related U.S. Application Data

(63) Continuation-in-part of application No. 13/020,596, filed on Feb. 3, 2011, now Pat. No. 8,750,647.

(51) Int. Cl.
*G06K 9/00* (2006.01)
*G06T 3/40* (2006.01)
*H04N 5/232* (2006.01)
*H04N 5/247* (2006.01)
*H04N 5/33* (2006.01)

(52) U.S. Cl.
CPC .......... *G06T 3/4053* (2013.01); *H04N 5/23232* (2013.01); *H04N 5/247* (2013.01); *H04N 5/332* (2013.01)

(58) Field of Classification Search
None
See application file for complete search history.

(56) References Cited

U.S. PATENT DOCUMENTS

2007/0217713 A1* 9/2007 Milanfar et al. .............. 382/299

* cited by examiner

*Primary Examiner* — Wesley Tucker
(74) *Attorney, Agent, or Firm* — Sunstein Kann Murphy & Timbers LLP

(57) ABSTRACT

Methods and a computer program product for deriving a super-resolution image of a physical object by fusing cameras of multiple resolutions (spatial, temporal, or spectral), the super-resolution image characterized by a resolution exceeding a "camera imaging resolution" associated with each of a sequence of lower-resolution images of the physical object. The sequence of images of the physical object is obtained at a plurality of relative displacements with respect to the object by a hybrid camera system comprising at least two imaging systems. The imaging systems are characterized by respective temporal and spatial resolution and by spectral sensitivity, and may be distinct from one another in one or more of the foregoing dimensions. The imaging systems are either fixed, or subject to know motion, relative to each other. Image sequences derived by each imaging system are coregistered and deconvolved to solve for a resultant sequence of images.

8 Claims, 10 Drawing Sheets

HYPER-RESOLUTION IMAGING

The present application is a continuation-in-part of U.S. patent application Ser. No. 13/020,596, filed Feb. 3, 2011, and incorporated herein by reference.

TECHNICAL FIELD

The present invention relates to novel methods for enhancing spatial resolution by co-registration of multiple imaging devices that are in motion and that may differ in one or more of spatial, temporal and spectral resolution.

BACKGROUND ART

Definitions

As used herein and in any appended claims, the term "image" shall refer to any multidimensional representation, whether in tangible or otherwise perceptible form, or otherwise, whereby a value of some characteristic (such as radiance, brightness, temperature, etc.) is associated with each of a plurality of locations corresponding to dimensional coordinates of an object in physical space, though not necessarily mapped one-to-one thereonto. Thus, for example, the graphic display of the spatial distribution of some field, either scalar or vectorial, such as brightness or color, constitutes an image. So, also, does an array of numbers in a computer memory or holographic medium. Similarly, "imaging" refers to the rendering of a stated physical characteristic in terms of one or more images.

The term "object" shall refer to a tangible, non-transient, physical object capable of being rendered as an image. The object may be a building or other structure, for example. The term "scene" encompasses one or more objects within a field of view of a sensor.

The "bandwidth" (or "information bandwidth") of an imaging system shall be defined as the product of the spatial resolution (quoted in total number of pixels per frame) times the color depth (in bits), times the frame rate (in frames per second), or any equivalent measure of the information content of an image.

The term "camera imaging resolution" shall refer to one or more imaging resolutions, typically lower than the final resolution of the processes described herein, which characterize the sequence of images serving as input to methods in accordance with the present invention, whether or not the images are obtained by an actual "camera" or using another modality, including ultrasound, etc.

The term "super-resolution image," as used herein and in any appended claims, shall refer to an image characterized by a spatial resolution exceeding the original native resolution of an image of at least one camera used in obtaining the image.

The term "detector" may be used herein comprehensively, and interchangeably with the term "sensor," with either term applying either to a single detector element or to an array of sensors or detectors, whether sensitive to the flux of impinging photons, or whether sensitive to temperature in radiative equilibrium with a distant source, such as a bolometer. An array of detectors at the focal plane of an optical system may also be referred to, herein, as a "camera."

A "hybrid camera system" shall refer to an imaging system that employs more than a single camera. The cameras of a hybrid camera system may cover distinct spectral ranges, and may have distinct spatial and/or temporal resolutions, however they are not required to do so within the scope of the invention.

The spatial resolution of an image is fundamentally diffraction-limited by the wavelength of imaging light (or other modality, such as ultrasound or particle beam). In practice, in fact, the resolution of optical systems is poorer yet, and is typically specified in terms of a point spread function (PSF), which represents the impulse response of an imaging system to a point source. In full generality, the PSF is a complex function, i.e., encompassing both the phase and amplitude of the response. The PSF, generally, may vary with the position of the point within the field of view of an imaging system with respect to which the response is being characterized. An image, as obtained by an imaging system, may be represented as the actual source scene convolved with the PSF over the field of view.

Super-resolution (SR) refers to a class of techniques that provide for exceeding the resolution limit imposed by a particular imaging system, or, even by the physical diffraction limit. Super-resolution has extended the information capture abilities of imaging systems. With the increasing availability of cheaper, more computationally powerful processors, super-resolution algorithms are becoming more common. In order to achieve super-resolution, more information must be employed: either constraints on the geometry of the imaged scene, or else a multiplicity of images derived, for example, during the course of relative motion of the imaging system with respect to the imaged scene. Various SR techniques known in the art are described in Chaudhuri (ed.), *Super-Resolution Imaging*, (Springer 2001), and in Bannore, *Iterative-Interpolation Super-Resolution Image Reconstruction* (Springer, 2009), both of which are incorporated herein by reference.

Super-resolution has an inherent limitation, however: for an observed low-resolution image, there are many possible high-resolution images that the camera could have blurred to generate the observed low-resolution image. Super-resolution is an ill-posed inverse problem, a class of computationally challenging inference problems. Many existing SR techniques that reconstruct a SR image from multiple images, derived, for example, in the course of motion, do so by performing a "blind" deconvolution, which is to say that the PSF is modeled at the same time that the image is being sharpened. Blind deconvolution concurrently approximates both the unknown high-resolution image and the blurring process, and is described, for example, in Takeda et al., "Removing Motion Blur with Space-Time Processing," *IEEE Trans. Image Proc.* (in press, 2010, available at http://users.soe.ucsc.edu/~milanfar/publications/journal/MotionDeblurringRevised.pdf), which is incorporated herein by reference.

Although existing super-resolution algorithms can perform well in laboratory conditions with very well described blurring conditions, real-world applications of super-resolution have lagged because of the complexity of real blurring and degradation conditions. Since the "inverse problem" is ill-posed and its solution is notoriously an unstable, iterative process, an efficient and stable technique for obtaining a super-resolved image from motion data is, thus, highly desirable.

Other super-resolution algorithms, such as the Pixon method, widely used in infrared astronomy and described in U.S. Pat. No. 5,912,993, require expansion of multi-resolution data in terms of a set of generalized image cells.

Several registration systems have been built that use motion data to achieve super-resolution imaging, however many of the prior art systems use external measures of camera position, such as accelerometers, gyroscopes, and magnetometers. These external measures suffer from drift problems, in which small errors are compounded over time and with camera motion. Indeed, the external measures of camera position are rarely as precise as the co-registration of multispectral cameras using a pixel of the high-resolution cameras. Therefore it would be desirable for there to be an efficient, stable and robust technique for performing image registration directly from the images themselves.

The use of hybrid camera systems for deblurring motion of an object is discussed in U.S. Pat. No. 7,440,634 (to Ben-Ezra), and in Li et al., *A Hybrid Camera for Motion Deblurring and Depth Map Super-Resolution, IEEE Conf. on Computer Vision & Pattern Recognition*, pp. 1-8 (2008), both of which are incorporated herein by reference. Both papers describe hybrid camera systems for deblurring motion of an object against a background.

A hybrid camera system employing a color camera and a monochromatic camera for spectral imaging at video rates has been described by Cao et al., *High Resolution Multispectral Video Capture with a Hybrid Camera System, Proc. IEEE CVPR*, pp. 1-8 (2011), which is incorporated herein by reference. Matsui et al., *Image Enhancement of Low-light Scenes with Near-infrared Flash Images, IPSJ Transactions of Computer Vision & Applications*, vol. 2, pp. 215-223 (2010), incorporated herein by reference, taught the use of slow color exposure in the visible enhanced with NIR flash images.

None of the prior art techniques employing hybrid cameras have sought to achieve resolution finer than the resolution of any of the cameras employed, in the combination of temporal, spatial, and spectral domains. This capability is referred to as "hyper resolution imaging" and is achieved for the first time in accordance with the teachings of the present invention as described below.

SUMMARY OF EMBODIMENTS OF THE INVENTION

Accordingly, embodiments of the present invention provide methods for deriving a super-resolution image of a physical object. The methods have steps of:
a. receiving a first sequence of images of the physical object at a plurality of displacements derived from a first camera wherein each of the first sequence of images is characterized by a first camera imaging resolution;
b. receiving a second sequence of images of the physical object at the plurality of displacements derived from a second camera, motion of the second camera correlated in a known way with motion of the first camera, wherein each of the second sequence of images is characterized by a second camera imaging resolution;
c. co-registering the first sequence of images of the physical object with the second sequence of images; and
d. deconvolving coregistered first and second image sequences to solve for a resultant sequence of images characterized by a spatial resolution exceeding at least one of the first and the second camera imaging resolution.

In various other embodiments of the invention, motion of the second camera may be coupled to the motion of the first camera by a fixed relative displacement. At least one of the first sequence of images and the second sequence of images may include infrared features of light.

In accordance with further embodiments, the first sequence of images and the second sequence of images may be obtained in distinct spectral ranges. The first camera and the second camera are characterized by distinct temporal resolution.

In yet further embodiments, the step of deconvolving may include regularization, and, more particularly, Tikhonov regularization.

In accordance with alternate embodiment of the present invention, a computer program product is provided for use on a computer system for deriving a super-resolution image of a physical object. The computer program product has a computer usable medium having computer readable program code thereon, and the computer readable program code includes:
a software module for storing a first sequence of images of the physical object at a plurality of displacements wherein each of the first sequence of images is characterized by a first camera imaging resolution;
a software module for storing a second sequence of images of the physical object at the plurality of displacements wherein each of the second sequence of images is characterized by a second camera imaging resolution;
a software module for co-registering the first and second sequence of images; and
a software module for deconvolving coregistered first and second sequences of images to solve for a resultant sequence of images characterized by a spatial resolution exceeding the first and the second camera imaging resolution.

BRIEF DESCRIPTION OF THE DRAWINGS

The foregoing features of the invention will be more readily understood from the following detailed description, considered with reference to the accompanying drawings, in which:

FIG. 6A plots camera motion as derived by passive image registration taught below; FIG. 6B depicts a kinetic point spread function (PSF) based on camera motion; FIG. 6C is a heatmap of an error surface for registering the positions of two images, and FIG. 6D is a three-dimensional view of the error surface in FIG. 6C. Note the semi-planar grid caused by sub-pixel linear interpolation during image registration.

FIG. 7A is an original video frame; FIG. 7B is an original video frame image with bi-cubic interpolation; FIG. 7C is a kinetic super-resolution (KSR) image from a still camera video; and FIG. 7D is a KSR image from a camera motion video, all in accordance with embodiments of the present invention.

DETAILED DESCRIPTION OF SPECIFIC EMBODIMENTS

Further Definitions

Figure 1:
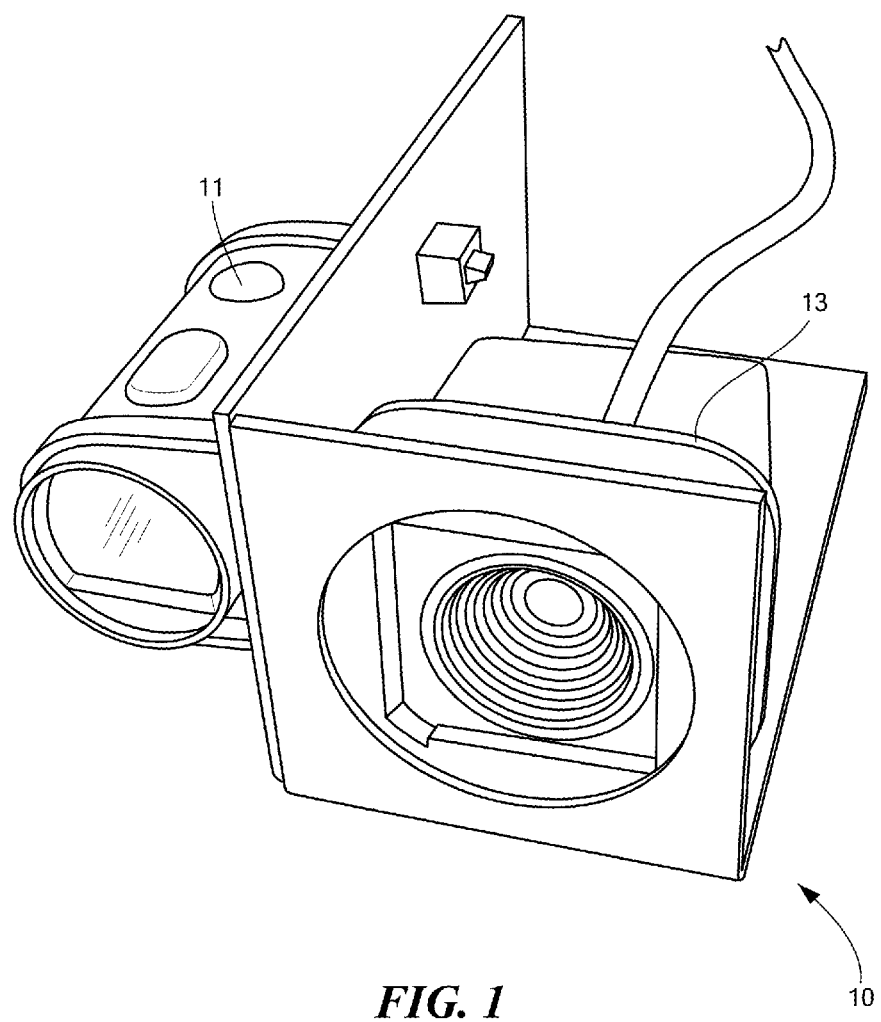
FIG. 1 depicts a coupled imaging device for hyper resolution multiframe imaging, in accordance with an embodiment of the present invention.

A "kinetic point spread function" is a point spread function derived on the basis of relative motion of an object and a camera used for imaging the object, however the relative motion itself may be derived.

The terms "displacement" and "offset" shall not be limited to a translational offset but shall include rotation as well, such that any solid body motion may be referred to herein, and in any appended claims, as a "displacement."

The term "passive," where applied to the registration of video frames, shall denote registration on the basis of image analysis rather than on the basis of deterministically moving a camera.

The term "motion error," as used herein and in any appended claims, shall refer to an offset (to which standard statistical measures such as successive moments may be applied) of an inferred position in an image array of an imaged element relative to an actual position in the face of relative motion between the imaged object and an imaging system. Mathematically, the "motion error" represents the square of the difference between an actual value and an image-inferred value, where the difference is given by $\Sigma_t \vec{x}_t - i(\vec{x}_t)$, where $\vec{x}_t$ is the actual position at time t, and $i(\vec{x}_t)$ is the image-inferred position.

For any imaging system, there is a maximum bandwidth, referred to herein as "Q," that is associated with the system. For example, an infrared camera with 640×480 resolution, 14-bit color depth, and 30 frames per second (fps) has a fixed bandwidth Q of $Q_{IR\text{-}camera}=(640\times480)\cdot(14\text{ Bit})\cdot(30\text{ fps})$.

A plot of a system's "Q" in dimensions that may encompass spatial, temporal, and/or spectral domains, may be referred to herein as a "Q-curve."

Using multi-frame, multi-spectral, and multi-camera super resolution, in accordance with a motion-based super resolution algorithm such as described below, multiple low-resolution imaging frames from a plurality of cameras (or imaging systems) are combined, and sub-pixel shift information from the higher resolution may be used to infer spatial information at a sub-pixel level. By combining multiple temporal frames of multiple camera frames, overall resolution may be improved, in certain cases to a point that exceeds the resolution of any one of the multiple cameras. In the example (below), we show the relative scale of diffraction limited pixel size of an EO, MWIR, and LWIR pixels. By co-registering multiple cameras in multiple plurality, precise subpixel shift information may be obtained at resolutions beyond two orders of magnitude smaller than the native resolution of an imaging modality. This is then used to deconvolve the low resolution image to obtain the corresponding high resolution pixel value.

$$\text{Minimization of } \hat{X} = \underset{X}{\operatorname{argmin}} \sum_{k=1}^{K} \|DF(k)HX - Y\|_1^1,$$

as taught below, reconstructs the unknown high-resolution image X from the sequence of low-resolution images Y. Hyper-resolution's benefit is this process is to allow much more fined-grained sampling of Y with precisely-known spatial offsets (which are captured in the motion matrix F). In the absence of image noise and blur, dense sampling allows for perfect reconstruction of X. The mathematical formulation is a system of linear equations; super-resolving X for a factor m is mathematically equivalent to reconstructing a signal from m basis functions. Given at least m samples, the coefficients of those basis functions may be solved for in closed form, thereby perfectly reconstructing the signal.

The use of multiple wavelength modalities, such as electro-optical (EO), near infrared (NIR), short-wave infrared, mid-wave infrared (MWIR) and long-wavelength infrared (LWIR), provide examples encompassed within the term "hyper-resolution imaging." Using techniques in accordance with the present invention, resolution enhancement by one or two orders of magnitude may be advantageously achieved. Diffraction-limited pixel dimensions of an LWIR camera are typically on the order of 8 μm, while corresponding scale sizes of diffraction-limited imaging are 3 μm in the MWIR, and 35 nm for an EO camera.

Definition

As used herein, "hyper resolution" shall mean the process of combining two or more imaging systems differing in at least one of spatial, temporal, or spectral resolution, to achieve super resolution.

For heuristic convenience, hyper resolution will be described in terms of two imaging systems, though it is to be understood that the number of imaging systems is not so limited within the scope of the present invention. The basis for hyper-resolution lies in a tightly coupled multi-camera setup where the motion of both imaging systems is well understood and can be mapped precisely. Thus, for example, referring first to FIG. 1, two cameras 11 and 13 may be fixed relative to one another by virtue of attachment to a common camera mounting structure, designated generally by numeral 10. However, it is to be understood that cameras 11 and 13 need not be fixed relative to one another, within the scope of the present invention, as long as their relative motion is known with sufficient accuracy.

Figure 2:
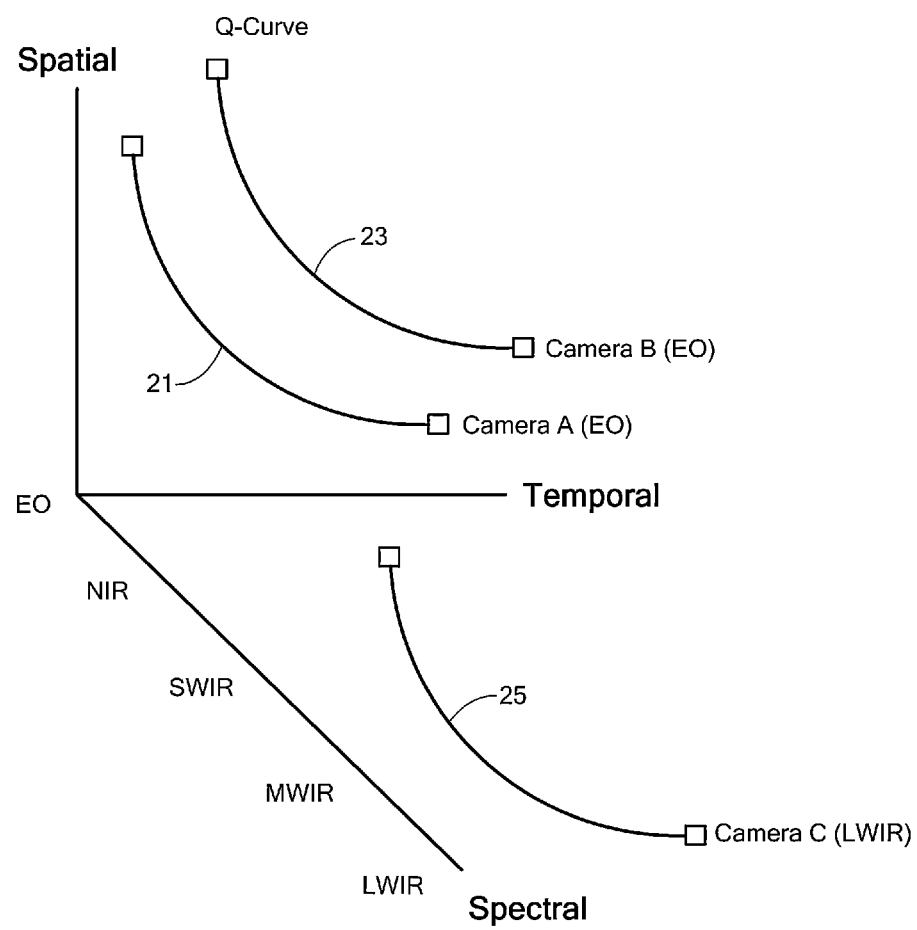
FIG. 2 shows conceptual "Q-curves" (as defined below) for three representative camera systems.

Examples of imaging systems to which hyper resolution may be applied include those whose "Q curves" (as defined above) are plotted in FIG. 2. Curve 21 represents a Q curve (the locus of combinations of resolution yielding a maximal product of resolutions in respective dimensions) showing the tradeoff of spatial resolution vs. temporal resolution for a first imaging system. Curve 23 represents a Q curve for a second imaging system, one with superior spatial and temporal characteristics relative to those of the first imaging system. Both curves 21 and 23 lie in the plane associated with the EO spectral imaging modality, while curve 25 corresponds to a third imaging system that employs long-wavelength infrared (LWIR) imaging, and lower spatial and temporal resolution relative to those of the first and second EO systems depicted.

When multiple Q-curves are combined, more information is available to help solve the problem of improving the resolution of a pixel. Examples of combinations of cameras that have been found to be particularly beneficial upon application of hyper resolution include:
1. Combination A: LWIR (640×480 Resolution, 14 bit, 30 fps) & EO (1920×1080, 24 bit, 60 fps);
2. Combination B: LWIR (640×480 Resolution, 14 bit, 30 fps) & EO (640×480, 16 bit, 500 fps).

The foregoing combinations are taught solely by way of useful example, and without limitation.

The coupling effect of cross-registering information from two different camera systems may advantageously provide one or more of the following beneficial effects:
a. increased motion tracking resolution for spatial and temporal domains;
b. reduced motion tracking errors;
c. imaging with multi-modality, across a broader combination of frequency spectrum; and
d. enhanced single-frame motion deblurring.

In accordance with embodiments of the present invention, a first sequence of images $I_{t1}(x, y)$, $I_{t2}(x, y)$, ... $I_{tN}(x, y)$ obtained using a first imaging system are coregistered with a second sequence of images $I'_{t2}(x', y')$, $I'_{t2}(x', y')$, ... $I'_{tM}(x', y')$ obtained using a second imaging system, where there need not be any overlap between the temporal or spatial slices. Co-registration is performed using an algorithm such as now described in detail. The registration steps are:
1) removing the image lens warp by calibrating with a checkerboard, as described, for example, by Kuntz, *OpenCV Tutorial*, http://dasl.mem.drexel.edu/~noah-Kuntz/openCVTut10.html, (2009), incorporated herein by reference;
2) finding the best image alignment by
   (a) in the frequency domain by the location of the peak of the phase correlation, as taught by Stone, *A Fast Direct Fourier-Based Algorithm for Subpixel Registration of Images, IEEE Transactions on Geoscience and Remote Sensing*, vol. 39, pp. 2235-2242 (2001), incorporated herein by reference; or
   (b) in the spatial domain, by either cross-correlation or by matching control points with algorithms such as RANSAC, as available for MATLAB, for example.

Figure 3A:
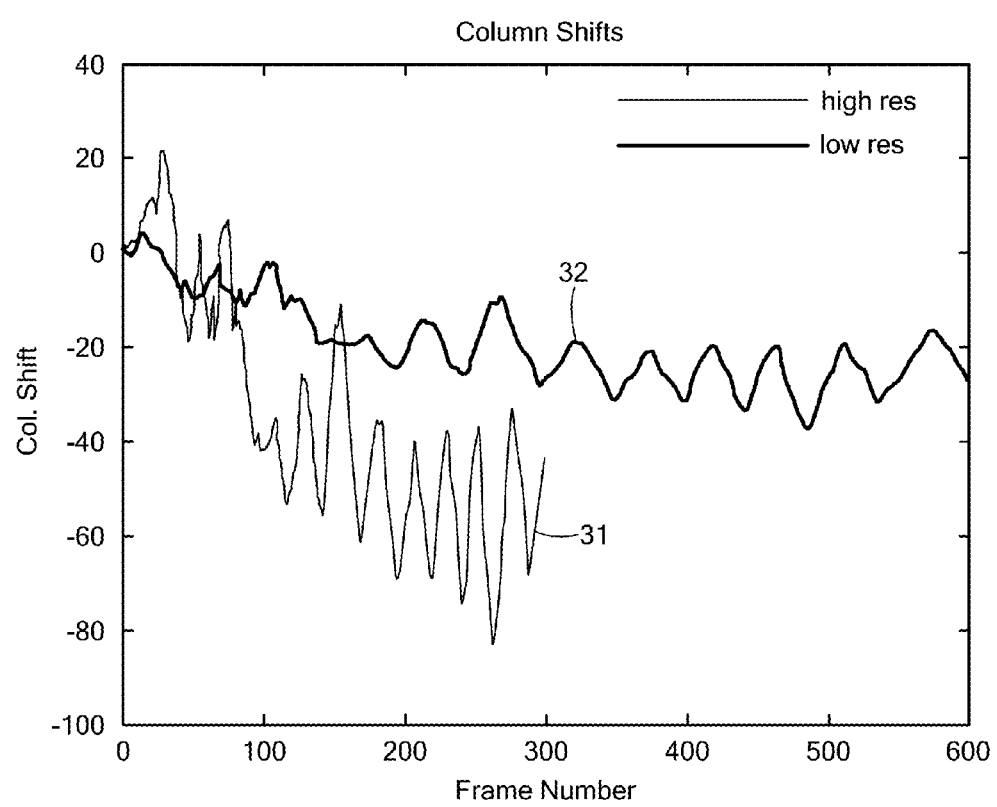
FIG. 3A plots row shifts applied to successive frames of high-resolution and low-resolution imaging systems, respectively, in order to maintain co-registration in the course of motion tracking, in accordance with embodiments of the present invention.
Figure 3B:
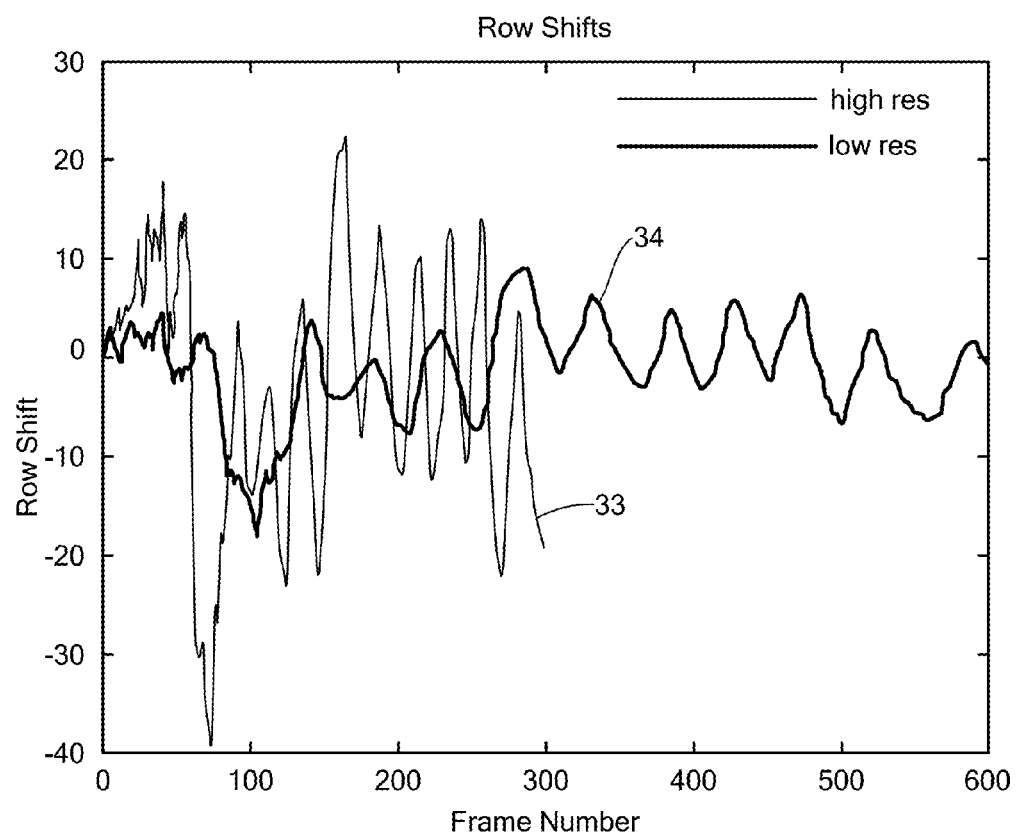
FIG. 3B plots column shifts applied to the successive frames of high-resolution and low-resolution imaging systems as in FIG. 3A.
Figure 3C:
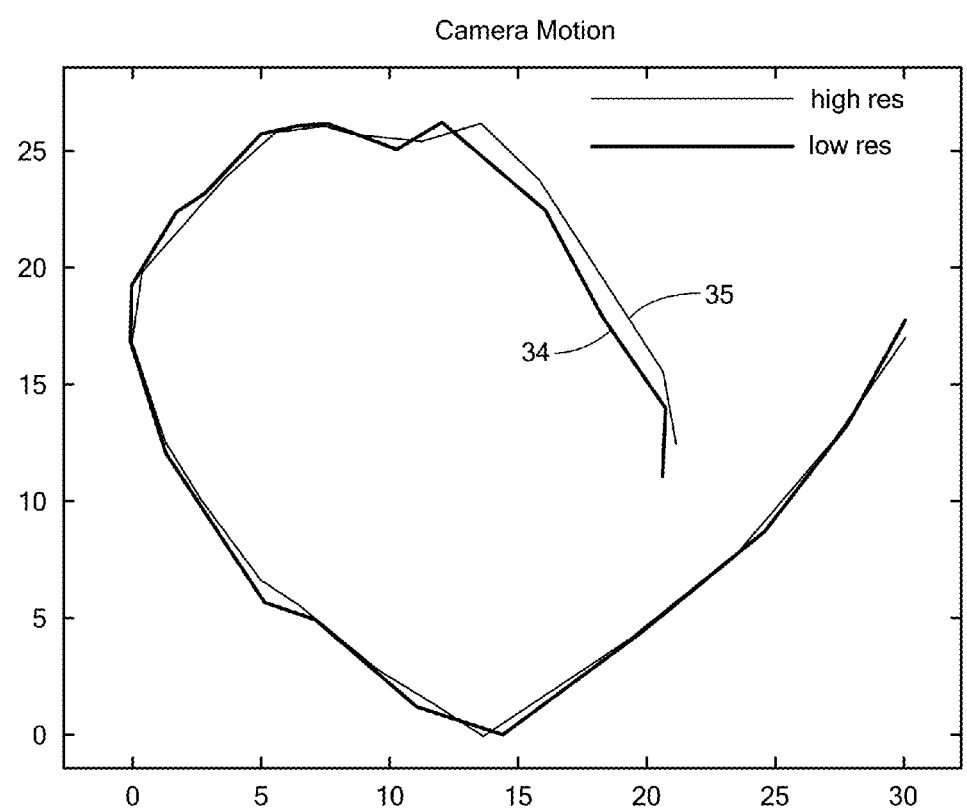
FIG. 3C plots the normalized motion of the respective imaging systems as coregistered in accordance with embodiments of the present invention.

Co-registration of a first and second sequence of images, obtained using spatially coupled imaging modalities and performed in accordance with the algorithm described above, allows for column and row shifts to be derived. These are depicted in FIGS. 3A and 3B, respectively, where curves 31 and 33 plot row/column shifts of successive low-resolution frames, and curves 32 and 34 plot row/column shifts of successive high-resolution frames. FIG. 3C plots the normalized motion of the respective low-resolution (35) and high-resolution (36) imaging systems as coregistered in accordance with embodiments of the present invention.

Figure 4A:
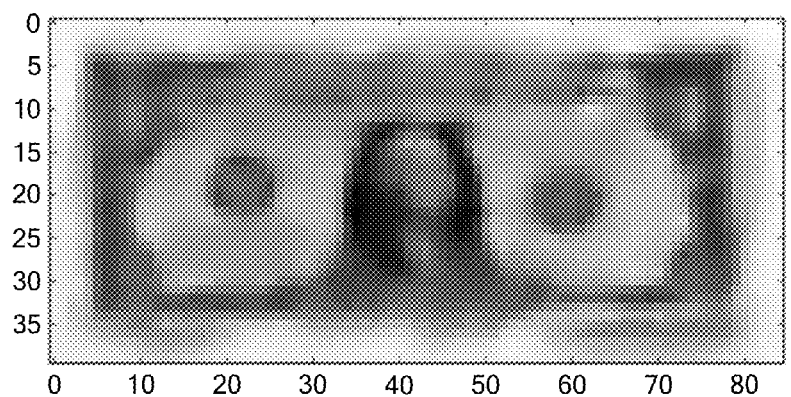
FIG. 4A depicts a zoomed-in original high-resolution video frame, with its counterpart low-resolution frame shown in FIG. 4B.
Figure 4B:
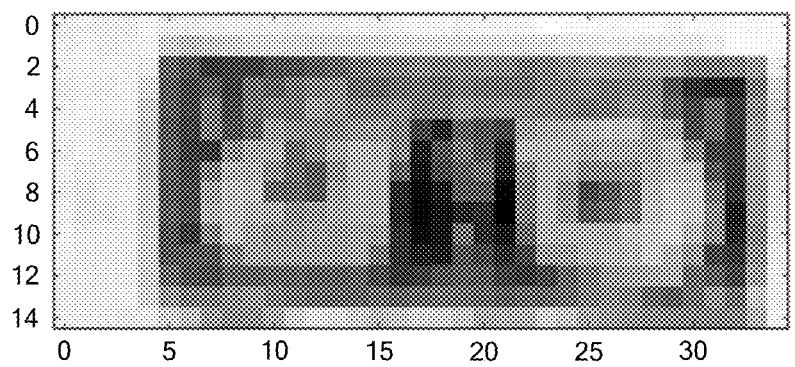
FIG. 4C is an image derived from the low-resolution camera by application of the hyper resolution techniques described in accordance with an embodiment of the present application.
Figure 4C:
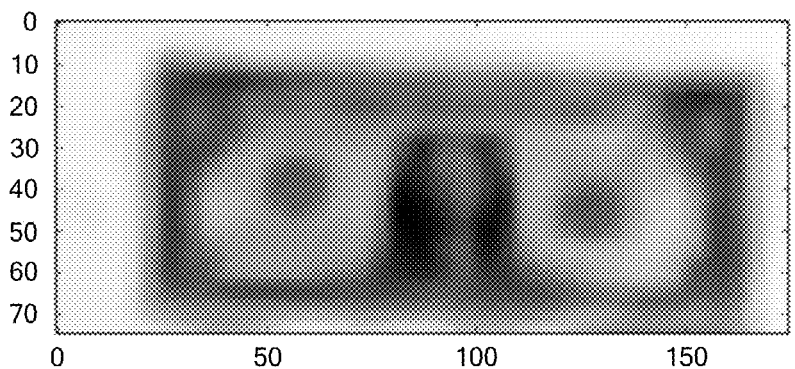
Figure 5:
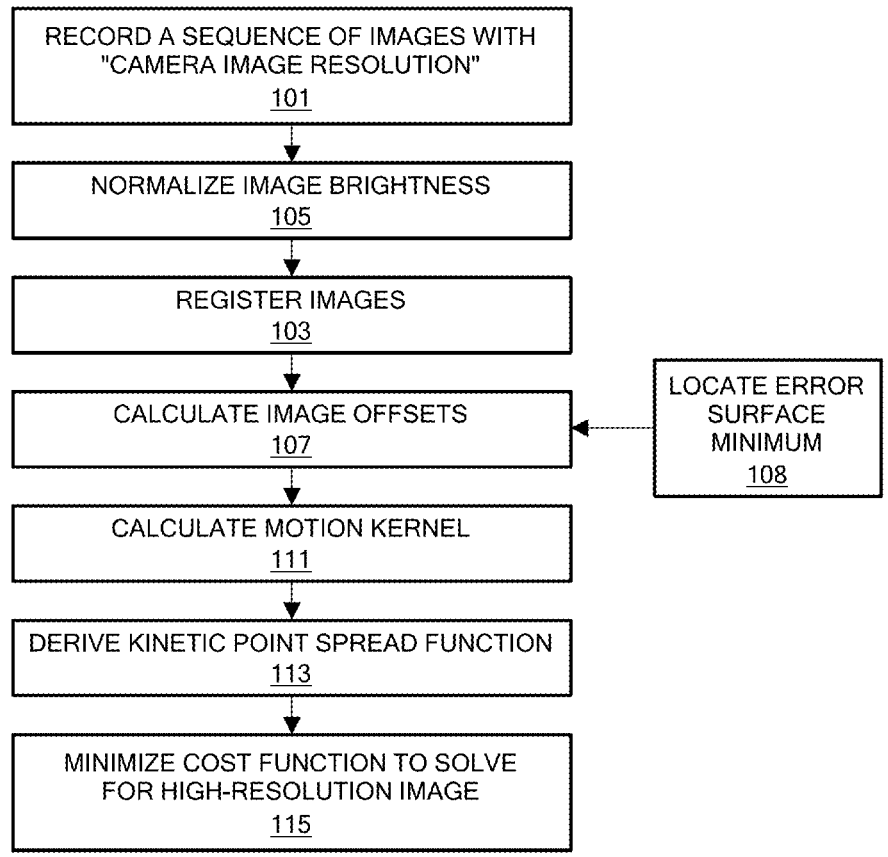
FIG. 5 is a flowchart depicting steps in practice of an embodiment of the present invention.
Figure 6A:
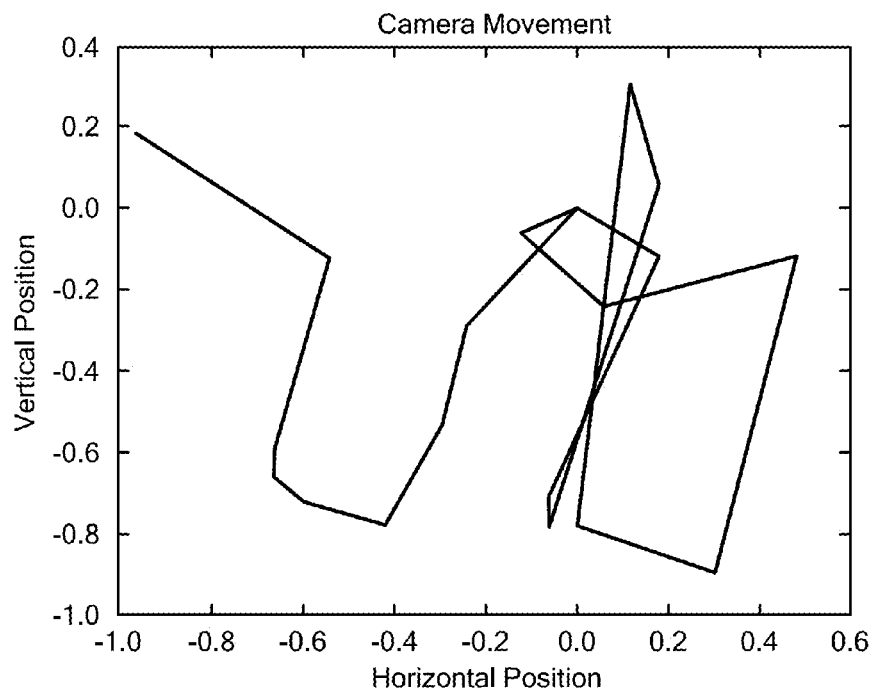
FIGS. 6A-6D characterize the relative motion of a camera and a physical object, in accordance with embodiments of the present invention.
Figure 6B:
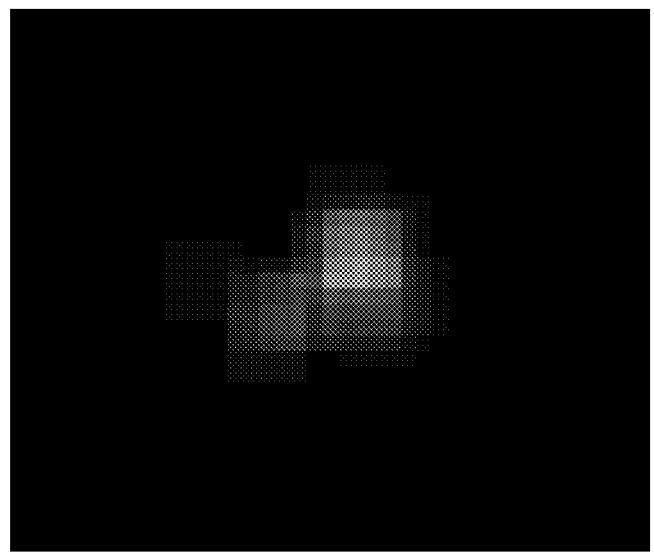
Figure 6C:
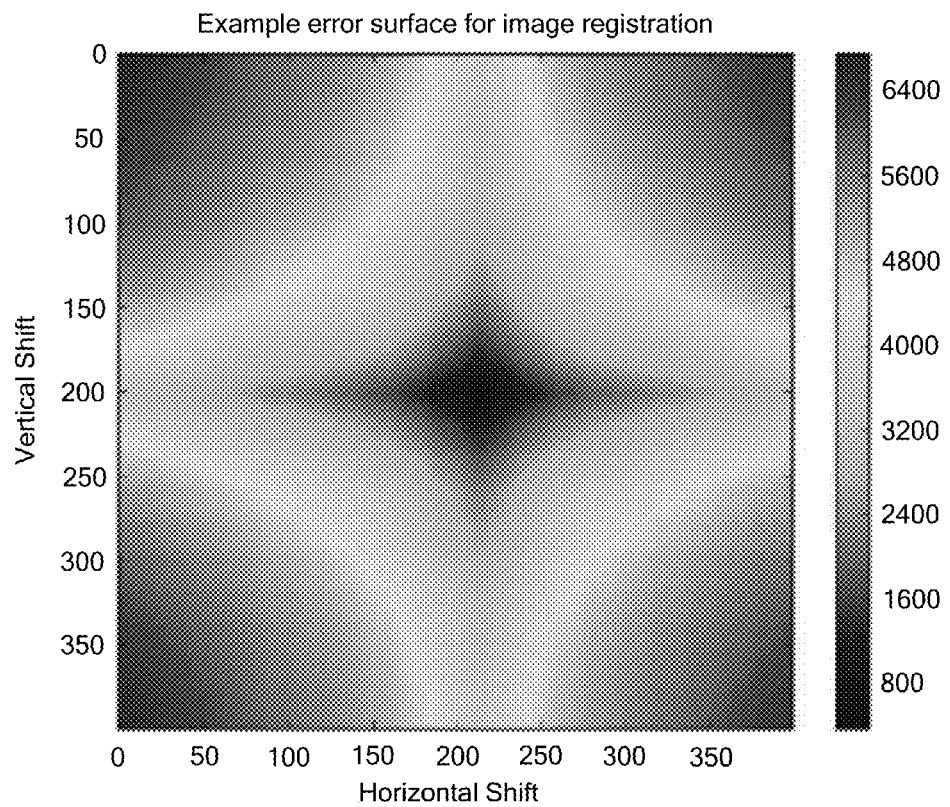
Figure 6D:
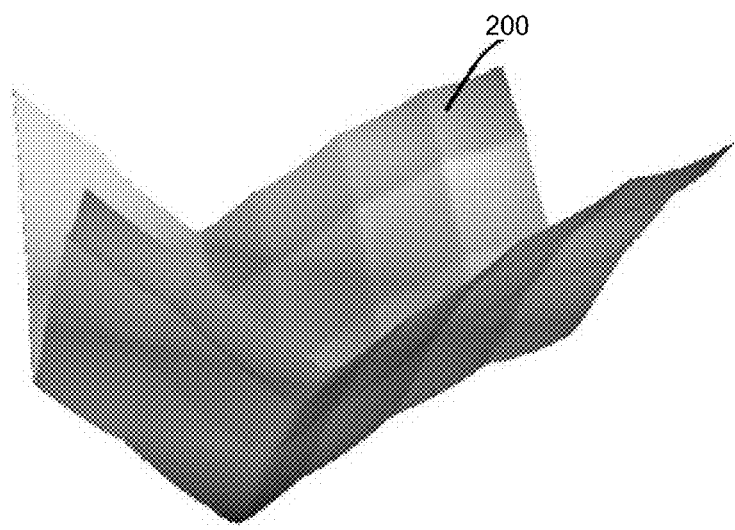
Figure 7A:
FIGS. 7A-7D illustrate the resolution benefit of camera motion, where
Figure 7B:
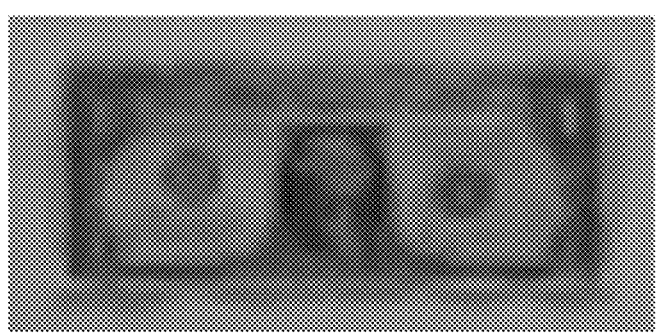
Figure 7C:
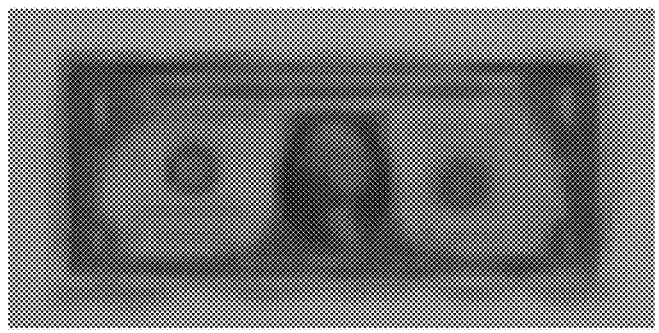
Figure 7D:
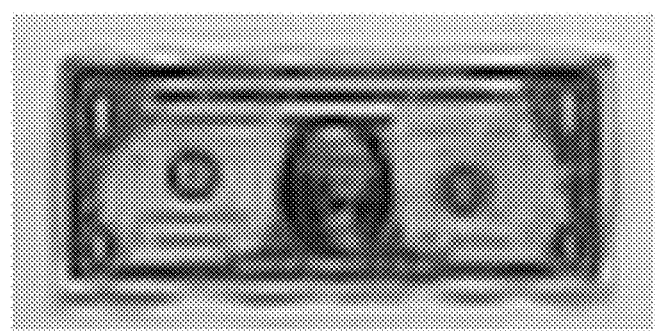

Results of hyper resolution processing of images obtained using two coupled imaging systems are depicted in FIGS. 4A-4C. FIG. 4A depicts a zoomed-in original high-resolution video frame, with its counterpart low-resolution frame shown in FIG. 4B. FIG. 4C is an image derived from the low-resolution camera by application of the hyper resolution techniques described in accordance with an embodiment of the present application.

In accordance with embodiments of the present invention, multiple images (each of which may be referred to, herein, as a "frame"), typically obtained from a camera (or other imaging modality, such as ultrasound, radar, or atomic force microscopy) are modeled, as is customary in SR processing, as a degradation of an unknown high-resolution image. A series Y(k) of k=1, 2, ... K low-resolution camera images may be represented as $$Y(k)=D(k)H(k)F(k)X+V(k), k=1, 2, \ldots, K,$$

where D(k) is a down-sampling operator (which may also be referred to, herein, as a "decimation operator"), H(k) is a blurring kernel, F(k) encodes the motion information of the kth frame, X is the unknown high-resolution image, and V(k) is additive noise. A high-resolution scale is associated with X, which is down-sampled to match the low-resolution scale associated with the series of low-resolution images. The super-resolution task is then to estimate the unknown high-resolution image X such that a blurred version of the estimate obtained maximally agrees with noisy observed images Y(k). In other words, the task is to minimize $$\hat{X} = \operatorname*{argmin}_{X} \sum_{k=1}^{K} \|DF(k)HX - Y\|_1^1.$$

In traditional solutions, the motion information in F is typically either ignored or incompletely utilized. Those studies that have focused on the imaging system's motion component have demonstrated the benefit of modeling the camera motion. Notably, Ben-Ezra et al., "Jitter Camera: A Super-Resolution Video Camera," *SPIE Visual Communications and Image Processing* 2006 *Proceedings*, vol. 6077 paper 60774 (2006), which is incorporated herein by reference, teaches a "jitter camera" that has an actuator-driven mirror with a precisely-controlled motion pattern. In accordance with the teachings provided herein, camera motion is neither deterministically driven, nor is it merely a nuisance to be corrected, but is a fundamental component of an imaging system.

A novel method, in accordance with preferred embodiments of the present invention, is now described with reference to the flowchart of FIG. 1. A video sequence is recorded (as designated by numeral 101) using a digital camera, such as a Microsoft web camera, or any other camera capable of electronically capturing a stream of images. (Indeed, any other imaging modality, including ultrasound, or imaging using charged particles, for example, are within the scope of the present invention.) Motion of an object to be imaged, also referred to herein as an "imaging target," relative to a focal plane of the camera is provided, either by moving the camera or by moving the imaging target. In one exemplary application of the present invention, the camera was held by hand and small motions were introduced through small hand movements, while, in another exemplary application of the present invention, the camera was set on a stable surface. In the example, the camera recorded 30 frames per second at 24-bit color depth and at 320×240 pixel resolution. The imaging target, for purposes of the example, was a US $1 bill taped to a whiteboard, approximately 3 meters from the camera.

Passive Registration of Video Frames

Multi-frame super-resolution is highly dependent on accurate and precise image registration. In accordance with the present invention, a simple spatial-domain method for sub-pixel image registration is introduced. This registration method is passive; instead of requiring external measures of camera position or active positioning markers, the method uses only a sequence of images.

Image registration (103) may be performed using various strategies, within the scope of the present invention, as claimed in any appended claims. Two such strategies include feature identification and tracking, and spatial similarity metrics. Feature identification is typically difficult and computationally complex, and is, therefore, not a preferred method for implementing the present invention. In accordance with preferred embodiments of the present invention, image registration 103 is performed on the basis of spatial similarity, which may be advantageously simpler and faster. Considering horizontal and vertical translation as well as rotation (i.e., assuming, solely for purposes of heuristic simplicity, constancy of the focal plane relative to the imaging target, although the claimed invention is not so limited), the total camera motion F is represented as product of translational and rotational motion operators $$F = S_x^l S_y^m R,$$

where $S_x^l$ and $S_y^m$ are the operators corresponding to shifted the image by l pixels in the horizontal direction and m pixels in the vertical direction, and R is the rotation matrix $$R = \begin{bmatrix} \cos(\theta) & -\sin(\theta) \\ \sin(\theta) & \cos(\theta) \end{bmatrix}$$

defined by a rotational angle θ. It is to be understood that F(k) may also include a focus factor accounting for camera motion along a line-of-sight to the imaged object, within the scope of the present invention. Most generally, F(k) accounts for orientation, scaling and tilting of respective images relative to a reference image.

The image brightness of successive images is normalized (105) to account for periodic camera recalibration of exposure settings while filming. Image brightness normalization may be performed, for example, by subtracting each video frame's mean pixel value from the image: $Y' = Y - \overline{Y}$, where Y is the original observed image and $\overline{Y}$ is its mean pixel value. With normalized images, the difference between a pair of video frames is substantially limited to positional movement. Thus, image offset between a reference image and a test image may be calculated 107 by defining a loss function L, where $$L(x,y,\theta;Y_0,Y_k) = |Y_0(x,y,\theta) - Y_k(x-x_k, y-y_k, \theta-\theta_k)|$$

and the optimal solution is defined by $$(l', m', \theta') = \underset{x,y,\theta}{\operatorname{argmin}} \|Y_0 - FY\|_1$$

where $x_k$, $y_k$, and $\theta_k$ are respectively the row, column, and angle offsets for image $Y_k$ compared to reference image $Y_0$.

Loss function L can be used to describe an error surface 200, quantifying the difference among images as a function of their respective offsets, as shown in FIG. 2. Error surface 200 can be filled in, between the pixel-scale grid points, by sub-pixel interpolation of image I. If the "video" (i.e., the image sequence) was obtained with sufficient light for an adequate signal strength, error surface 200 is well defined. For high signal-to-noise ratio conditions, the error surface minimum may be located (108) (shown in FIG. 1) with gradient descent techniques. In low-light and low signal-to-noise conditions, the minimum may be located by employing stochastic sampling, such as a genetic algorithm. FIG. 2 shows an example error surface for horizontal and vertical translational movement.

Minimizing the loss function is but one method for obtaining a reference image $Y_0$ with respect to which offsets may be defined. In accordance with other embodiments of the invention, there may be a high-resolution image, possibly obtained using a distinct imaging modality, that may be used as a reference image. In that case, offsets ($x_k$, $y_k$, $\theta_k$) are determined by matching the location of each low-resolution image to a corresponding location in the high-resolution image, which entails determining the phase shift of each low-resolution image inside the high-resolution image.

Resolution Improvement Through Image Aggregation

For heuristic convenience, it is assumed that the image sequence comes from the one camera, so that the decimation operator D(k)=D and blurring kernel H(k)=H do not change across the image sequence, although that assumption is not necessary for practice of the methods of the present invention as claimed. A gradient that defines the steepness of the error surface during image registration may be represented as $$G = \sum_{k=1}^{K} F^T(k) D^T \operatorname{sign}(DF(k)HX - Y(k)).$$

Images of the image sequence may be registered 103 by a gradient descent method such that either G=0 or the solver finds the minimum gradient subject to the boundary conditions of the search space of (x, y, θ). Image registration 103 may also be achieved by other means, within the scope of the present invention. The gradient descent approach, when employed, defines the relative positions of all images in an image sequence, which defines the camera movement.

Minimization of the loss function to yield ($x_k$, $y_k$, $\theta_k$) for each image $Y_k$ of the image sequence provides an accurate representation of camera movement F(k), which, in accordance with the present invention, may be used for extracting sub-pixel resolution information, as now described.

Deconvolution with a Motion-Based Blurring Kernel

Considering the camera movement F(k) an intrinsic quality of the imaging system, a kernel description of the motion may be defined (111) for deconvolution to improve image resolution. A two-dimensional impulse function is defined that is a matrix with all zeros except for a single one in the center.

$$I = \operatorname{diag}[0, \ldots, 0, 1, 0, \ldots, 0],$$

where I is defined in the low-resolution scale. In the high-resolution scale, I is a single block of ones:

$$I = \begin{bmatrix} 0 & & & & & & & 0 \\ & \ddots & & & & & \ddots & \\ & & 0 & 0 & 0 & 0 & 0 & \\ & & 0 & 1 & 1 & 1 & 0 & \\ & & 0 & 1 & 1 & 1 & 0 & \\ & & 0 & 1 & 1 & 1 & 0 & \\ & & 0 & 0 & 0 & 0 & 0 & \\ & \ddots & & & & & \ddots & \\ 0 & & & & & & & 0 \end{bmatrix}.$$

This motion-based kernel may be easily combined with the traditional optical-blur kernel by replacing the block of ones with the blurring matrix, such as a 2D Gaussian kernel.

In the foregoing example, a 3*3=9× resolution increase has been depicted from the low-resolution camera image resolution to the high-resolution scale. The motion-based point spread function may then be obtained by integration of that impulse function across the camera movements:

$$PSF = \sum_{k=1}^{K} F(k)I.$$

The foregoing point spread function may be referred to as a "kinetic point spread function" or a "kinetic PSF." The kinetic PSF, derived (113) in the foregoing manner, may be advantageously employed to remove the blurring effect of the kernel by applying standard deconvolution techniques, using regularization such as Tikhonov regularization. Accordingly, the cost function $$C = \sum_{k=1}^{K} \|DF(k)HX - Y\|_1^1 + \alpha\lambda(x)$$

is minimized, where $\lambda(x)=\|Qx\|_2^2$ is a penalty term in which the matrix Q represents a high-pass filter so that the regularization represents a general smoothness constraint. Minimizing C (115) provides the sought-after high-resolution image, X. FIG. 3 shows an example video frame images (FIGS. 3(a)-(c)) and the video sequence's kinetic super-resolution image (FIG. 3(d)).

By virtue of the image-based registration taught, above, in accordance with the present invention, additional registration flexibility is advantageously afforded. For example, the images can be registered to a coordinate system based on moving object, rather than on the absolute camera position.

In accordance with alternate embodiments of the present invention, the foregoing methods for improving the resolution of an image based on motion may be employed advantageously for enhanced digital zoom and mobile phone cameras.

Energy Efficiency and Infrared Imaging

Imaging at longer wavelengths is subject to constraints of lower resolution (and, typically, poorer sensitivity) than imaging at shorter wavelengths. In particular, infrared cameras have poorer resolution and field-of-view than counterparts in the visible portion of the spectrum. This is particularly the case in the "thermal" portion of the infrared spectrum, at wavelengths longward of 3-14 μm. Consequently, methods in accordance with the teachings herein may be used to great advantage in visualizing the temperature of scenes such as housing for purposes of detecting instances of heat loss and of improving energy efficiency. High-resolution infrared images are created by combining a series of low-resolution images, obtained with an infrared camera, and positioning them relative to a high-resolution image obtained in the visible portion of the spectrum.

In accordance with alternate embodiments of the present invention, a high-throughput remote sensing system is provided for identifying energy efficiency opportunities by targeting buildings with potential for significant return on investment in structural improvements.

Multi-Frame Image Enhancement

The foregoing teachings that provide for overlay and aggregation of images in order to achieve super-resolution may also be employed for purposes of improving signal to noise under conditions of low light. In accordance with alternate embodiments of the present invention, a preliminary step of image contrast enhancement is performed using histogram equalization to rescale pixel values to a range that shows more detail, such that $$p_x(i) = \frac{n_i}{n}, 0 \le i < 1$$

where $p_x(i)$ is the probability of an occurrence of pixel value I of a discrete image [x], $n_i$ is the number of pixels with value i, n is the total number of pixels in the image, and L is the total number of pixel levels in the image. The range of observed pixel values is then mapped onto a wider range according to $$y' = y(\max(|x|) - \min(|x|)) + \min(|x|),$$

where $y = cdf_x(x)$ is the cumulative distribution function of the probability distribution of the pixel values.

By modeling the shot-noise component in a sequence of frames, stable image features are identified stochastically that serve to register the images relative to one another. The images are then registered with a stochastic search over the error surface defined by the difference between a particular image and a reference image with a give offset:

$$E(x_k, y_k) = \sum_{x,y} \|I_0(x, y) - I(x - x_k, y - y_k)\|$$

where $x_k$, $y_k$, and $\theta_k$ are, respectively, the row, column and angular offsets for image $Y_k$ relative to reference image $Y_0$.

Once the registration offsets of the video frames have been determined, each pixel value is averaged over stack of collocated pixels, reducing the noise per pixel by $\sim\sqrt{N}$, where N is the number of stacked images, while avoiding motion blur, as the expected value of each value converges to the mean, while the variance is inversely proportional to N.

Once the superposition image has been obtained, kinetic super-resolution algorithm described in detail above may be applied.

A significant advantage that may be achieved in accordance with embodiments of the present invention is an ability to co-register motion with very low motion registration errors. The motion based registration error of the low resolution imager is a direct function of the error of the high resolution device (which is typically much less).

Though the specific example described with reference to FIG. 1 shows two imaging devices in the EO (Electro Optical) range, a more useful approach for this device is to couple two devices that have significantly cost/resolution differentials like an EO/Far IR combination where the high resolution, low cost functionality of the high resolution device and be used to significantly improve the imaging capabilities of the more expensive Far IR device.

By coupling two or more devices in different bands, like EO, Near IR, Far IR, Millimeter Waves, and others, many types of information beyond just shift information may be coregistered and may be useful in the reconstruction of high resolution information. Depth, angle, and texture information provide other useful information that can be transferred among imaging modalities.

The embodiments of the invention described herein are intended to be merely exemplary; numerous variations and modifications will be apparent to those skilled in the art. For example, other deconvolution algorithms are within the scope of the present invention, such as deconvolution algorithms weighted in accordance with local variance information, yielding standard deviation (STD) images, which are described in Rank et al., "Estimation of Image Noise Variance," *IEEE Proc. Vis. Image Signal Process.*, vol. 146, pp. 80-84 (1999), which is incorporated herein by reference.

Additionally, the process may be repeated in time, such that the resultant high-resolution image is itself one of a sequence of images that, together, constitute a video. All such variations and modifications are intended to be within the scope of the present invention as defined in any appended claims.

Additional description of techniques relating to the drive-by thermography problem to which the present invention may advantageously be applied may be found in Phan, *Automated Rapid Thermal Imaging Systems Technology*, (MIT Ph.D. Dissertation, 2012, unpublished as of the present filing), filed as an Appendix in copending U.S. patent application Ser. No. 13/568,546, filed Aug. 7, 2012, and, like that Application, is incorporated herein by reference.

In preferred embodiments of the present invention, the disclosed methods of hyper-resolution imaging are implemented as a computer program product for use with a computer system. Such implementations may include a series of computer instructions fixed either on a tangible medium, such as a computer readable medium (e.g., a diskette, CD-ROM, ROM, or fixed disk) or transmittable to a computer system, via a modem or other interface device, such as a communications adapter connected to a network over a medium. The medium may be either a tangible medium (e.g., optical or analog communications lines) or a medium implemented with wireless techniques (e.g., microwave, infrared or other transmission techniques). The series of computer instructions embodies all or part of the functionality previously described herein with respect to the system. Those skilled in the art should appreciate that such computer instructions can be written in a number of programming languages for use with many computer architectures or operating systems. Furthermore, such instructions may be stored in any memory device, such as semiconductor, magnetic, optical or other memory devices, and may be transmitted using any communications technology, such as optical, infrared, microwave, or other transmission technologies. It is expected that such a computer program product may be distributed as a removable medium with accompanying printed or electronic documentation (e.g., shrink wrapped software), preloaded with a computer system (e.g., on system ROM or fixed disk), or distributed from a server or electronic bulletin board over the network (e.g., the Internet or World Wide Web). Of course, some embodiments of the invention may be implemented as a combination of both software (e.g., a computer program product) and hardware. Still other embodiments of the invention are implemented as entirely hardware, or entirely software (e.g., a computer program product).

What is claimed is:

1. A method for deriving a super-resolution image of a physical object, the method comprising:
    a. receiving a first sequence of images of the physical object at a plurality of displacements derived from a first camera wherein each of the first sequence of images is characterized by a first camera imaging resolution;
    b. receiving a second sequence of images of the physical object at the plurality of displacements derived from a second camera, motion of the second camera correlated in a known way with motion of the first camera, wherein each of the second sequence of images is characterized by a second camera imaging resolution;
    c. co-registering the first sequence of images of the physical object with the second sequence of images; and
    d. deconvolving coregistered first and second image sequences to solve for a resultant sequence of images characterized by a spatial resolution exceeding the first and the second camera imaging resolution.

2. A method in accordance with claim 1, wherein the motion of the second camera is coupled to the motion of the first camera by a fixed relative displacement.

3. A method in accordance with claim 1, wherein at least one of the first sequence of images and the second sequence of images includes infrared features of light.

4. A method in accordance with claim 1, wherein the first sequence of images and the second sequence of images are obtained in distinct spectral ranges.

5. A method in accordance with claim 1, wherein the first camera and the second camera are characterized by distinct temporal resolution.

6. A method in accordance with claim 1, wherein the step of deconvolving includes regularization.

7. A method in accordance with claim 6, wherein the regularization employed in the step of deconvolving includes Tikhonov regularization.

8. A computer program product for use on a computer system for deriving a super-resolution image of a physical object, the computer program product comprising a non-transitory computer usable medium having computer readable program code thereon, the computer readable program code including:
    a software module for storing a first sequence of images of the physical object at a plurality of displacements wherein each of the first sequence of images is characterized by a first camera imaging resolution;
    a software module for storing a second sequence of images of the physical object at the plurality of displacements wherein each of the second sequence of images is characterized by a second camera imaging resolution;
    a software module for co-registering the first and second sequence of images; and
    a software module for deconvolving coregistered first and second sequences of images to solve for a resultant sequence of images characterized by a spatial resolution exceeding the first and the second camera imaging resolution.

* * * * *